United States Patent
Marchini et al.

(10) Patent No.: US 11,312,093 B2
(45) Date of Patent: Apr. 26, 2022

(54) APPARATUS FOR APPLYING NOISE REDUCER ELEMENTS TO TYRES FOR VEHICLE WHEELS

(71) Applicant: PIRELLI TYRE S.P.A., Milan (IT)

(72) Inventors: Maurizio Marchini, Milan (IT); Cristiano Puppi, Milan (IT); Albert Berenguer, Milan (IT); Ivan Gildo Boscaino, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 59 days.

(21) Appl. No.: 16/853,643

(22) Filed: Apr. 20, 2020

(65) Prior Publication Data

US 2020/0247074 A1    Aug. 6, 2020

Related U.S. Application Data

(62) Division of application No. 16/062,336, filed on Jun. 14, 2018, now Pat. No. 10,710,323.

(60) Provisional application No. PCT/IB2016/057072, filed on Nov. 23, 2016.

(30) Foreign Application Priority Data

Dec. 23, 2015   (IT) .................... 102015000087338

(51) Int. Cl.
*B29D 30/00* (2006.01)
*B65H 3/22* (2006.01)
*B65H 3/34* (2006.01)
*B65H 5/00* (2006.01)
*B29C 31/04* (2006.01)
(Continued)

(52) U.S. Cl.
CPC .......... *B29D 30/0061* (2013.01); *B29C 31/04* (2013.01); *B29C 65/48* (2013.01); *B29D 30/0016* (2013.01); *B65H 3/22* (2013.01); *B65H 3/34* (2013.01); *B65H 5/006* (2013.01); *B29D 2030/0038* (2013.01); *B29K 2995/0002* (2013.01); *B60B 2900/133* (2013.01); *B60C 19/002* (2013.01); *B65H 2301/4222* (2013.01); *B65H 2301/42264* (2013.01); *B65H 2405/60* (2013.01); *B65H 2801/93* (2013.01)

(58) Field of Classification Search
CPC .... B60C 19/002; B60B 2900/133; B65H 3/22
See application file for complete search history.

(56) References Cited

U.S. PATENT DOCUMENTS 10,710,323 B2    7/2020 Marchini et al.
2018/0354215 A1   12/2018 Marchini et al.

*Primary Examiner* — Carson Gross
(74) *Attorney, Agent, or Firm* — Steinfl + Bruno LLP

(57) ABSTRACT

Apparatus for applying noise reducing elements to tyres for vehicle wheels. The apparatus includes a loading station of stacks of noise reducing elements, an extraction station of noise reducing elements from each stack placed downstream of the loading station, and a conveyor placed downstream of the extraction station and extending along a predefined path. The conveyor is configured for supporting and advancing in a row the noise reducing elements extracted from the stacks which are then applied to a radially inner surface of the tyres. The extraction of each of the noise reducing elements contemplates: retaining a first noise reducing element placed at the base of a stack; raising the remaining noise reducing elements of the stack from the first noise reducing element; moving away the first noise reducing element according to a set path; and lowering the remaining noise reducing elements of the stack.

13 Claims, 7 Drawing Sheets

(51) Int. Cl.
*B29C 65/48* (2006.01)
*B60C 19/00* (2006.01)

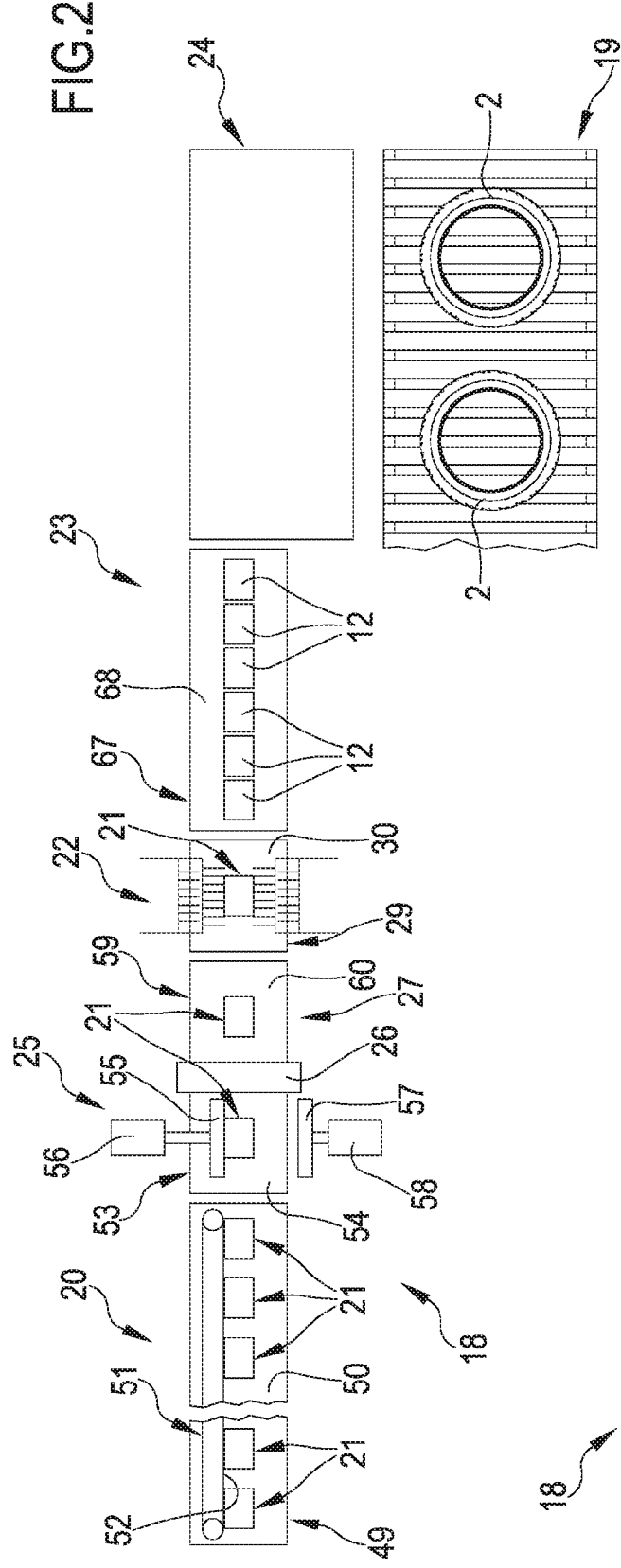
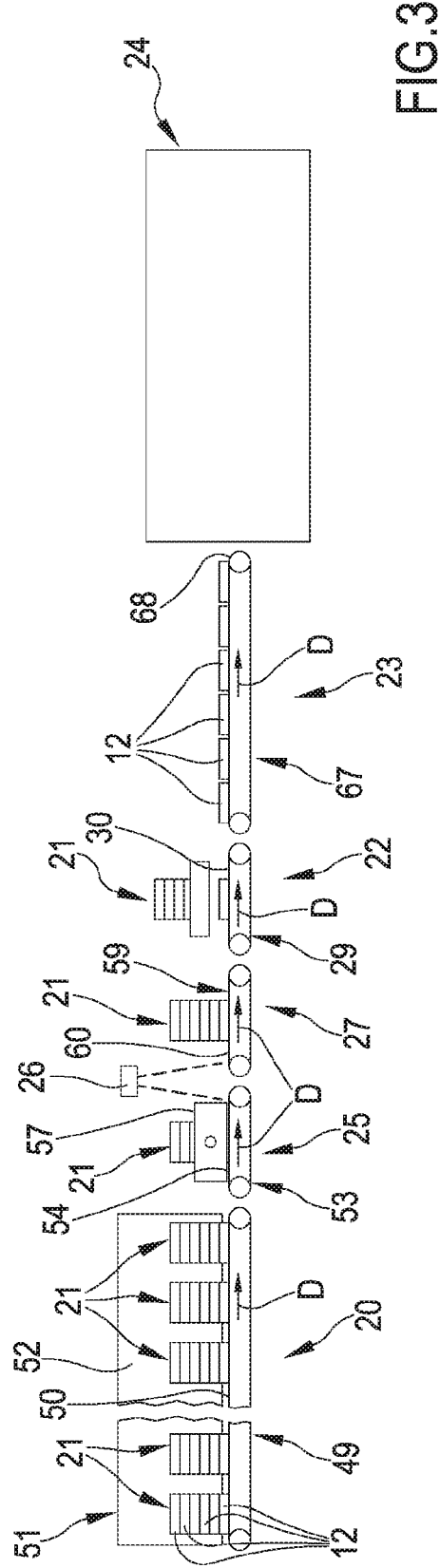

APPARATUS FOR APPLYING NOISE REDUCER ELEMENTS TO TYRES FOR VEHICLE WHEELS

CROSS REFERENCE TO RELATED APPLICATIONS

The present application is a divisional of U.S. patent application Ser. No. 16/062,336 filed on Jun. 14, 2018, which, in turn, is the U.S. national stage of International Patent Application PCT/IB2016/057072 filed internationally on Nov. 23, 2016, which, in turn, claims priority to Italian Patent Application No. 102015000087338 filed on Dec. 23, 2015, each of which are incorporated by reference herein in their entirety.

DESCRIPTION

Technical Field of the Invention

The present invention relates to a process and an apparatus for applying noise reducer elements to tyres for vehicle wheels.

The present invention falls within the field of processes and apparatuses for manufacturing tyres for vehicle wheels.

In particular, the present invention relates to a process and an automatic or semi-automatic apparatus for applying noise reducer elements to tyres for vehicle wheels.

The term "automatic" is used to indicate a process and a device in which substantially all the operations are carried out by mechanical devices (such as with electric, pneumatic, hydraulic actuation) preferably controlled by a control unit and by means of suitable software. The term "semi-automatic" is used to indicate a process and a device in which most of the implemented operations are carried out by the mechanical devices mentioned above and the operator's manual intervention is reduced to few and specific operations.

Background Art

A tyre for vehicle wheels generally comprises a carcass structure comprising at least one carcass ply having end flaps engaged with respective annular anchoring structures. A belt structure is associated in a radially outer position to the carcass structure, comprising one or more belt layers, arranged in radial superposition with respect to each other and with respect to the carcass ply, having textile or metallic reinforcing cords with crossed orientation and/or substantially parallel to the circumferential development direction of the tyre. A tread band is applied in a position radially outer to the belt structure, also made of elastomeric material like other semi-finished products making up the tyre. Respective sidewalls of elastomeric material are further applied on the lateral surfaces of the carcass structure, each extending from one of the lateral edges of the tread band up at the respective annular anchoring structure to the beads. In "tubeless" tyres, the carcass ply is internally coated by a preferably butyl-based layer of elastomeric material, usually called "liner" having optimal airtight characteristics and extending from one to the other of the beads.

The term "elastomeric material" is used to designate a composition comprising at least one elastomeric polymer and at least one reinforcement filler. Preferably, such composition further comprises additives such as, for example, a cross-linking agent and/or a plasticiser. Due to the presence of the cross-linking agent, such material can be cross-linked by heating, so as to form the final manufactured article.

The expression "noise reducer element" means an element which, once associated with a radially inner surface of a tyre, has the ability to attenuate the noise produced by the tyre itself during use. This ability can be conferred to said element by the type of material, or materials, with which said element is made and/or by the shape of the same. Such noise reducer elements usually consist of blocks of porous material such as, for example, foamed polymeric material.

By "equatorial plane" of the tyre it is meant a plane perpendicular to the axis of rotation of the tyre and which divides the tyre into two symmetrically equal parts.

The terms "radial" and "axial" and the expressions "radially inner/outer" and "axially inner/outer" are used referring to a direction perpendicular and a direction parallel to the axis of rotation of the tyre, respectively. The terms "circumferential" and "circumferentially" are used with reference to the direction of the annular development of the tyre, namely the rolling direction of the tyre.

Document EP2067633 describes a noise reduction device and a tyre, in which the tyre vibration and noise can be reduced. The noise reduction device comprises two main sound-absorbing elements adapted to change the sectional area of a cavity of the tyre and two auxiliary sound-absorbing elements arranged between the two main sound-absorbing elements.

Document EP2123491 describes a noise reduction device comprising at least one sound-absorbing element made of porous material attached to the inner surface of the tread portion of the tyre. The sound-absorbing element may include a plurality of parts arranged spaced apart along a circumferential direction of the tyre.

SUMMARY

In this context, the Applicant has felt the need to increase the productivity of the lines dedicated to the manufacture of tyres provided with noise reducer elements and to improve the quality and performance of this type of tyres.

The Applicant has in fact observed that the known noise reducer elements very often consist of blocks of porous material of substantially parallelepiped shape which are glued to the inner surface of the tyre.

The Applicant has observed that the blocks of porous material defining the noise reducer elements have high friction coefficient surfaces thereof, so that the sliding between two or more blocks placed in mutual contact is considerably difficult, as is the sliding of each block of surfaces designed for the transport and/or movement of the blocks themselves.

The Applicant has further observed that such blocks of porous material may be made from larger blocks that are subsequently cut into desired sizes and then packaged. Each bale can hold hundreds of noise reducer elements arranged in stacks of dozens of elements each.

The Applicant has noted that, due to the low propensity to slide with respect to each other and with respect to the surfaces with which they come in contact, the management of noise reducer elements, for example meant as handling of the single blocks starting from the bales, as well as their transportation, is critical.

In particular, the Applicant has noted that the interaction of noise reducer elements with one another and with the surfaces with which they come into contact makes it difficult to ensure the correct position thereof in the different management steps of the same; in particular, it may lead to inaccuracies in the positioning of said noise reducer elements downstream of the transport steps when they are provided to pick-up and application devices of said elements on the tyres, thus implying possible inefficiencies in the application step of the same to the tyres.

In this context, the Applicant has therefore felt the need to intervene on the accuracy and repeatability with which said noise reducer elements are managed to be subsequently applied to the tyre.

The Applicant has perceived that, in order to obviate the above-mentioned drawbacks, it may be useful to manage, in a first step, such noise reducer elements sorted in stacks and then successively feed the single noise reducer elements to a device for the application of the same to tyres.

The Applicant has thus found that by picking up such stacks directly from the bales containing the noise reducer elements and feeding them to an extraction station, in which individual single noise reducer elements are extracted from at least one stack at a time, releasing them from the remaining reducer elements present in the stack, it is possible to considerably increase the above repeatability and accuracy.

According to one aspect thereof, the present invention therefore relates to an apparatus for applying noise reducer elements to tyres for vehicle wheels.

The apparatus comprises: a loading station of stacks of noise reducer elements; an extraction station of noise reducer elements from each stack, wherein said extraction station is placed downstream of the loading station.

Preferably, a conveyor is placed downstream of the extraction station and extends along a predefined path, wherein said conveyor is configured for supporting and advancing in succession the noise reducer elements extracted from the stacks.

Preferably, the extraction station comprises a first conveyor having a first upper transport surface configured for supporting at least one stack at a time, wherein said first upper transport surface is movable along a predefined direction.

Preferably, the extraction station comprises a retention device operatively active above the first upper transport surface and configured for retaining a first noise reducer element placed at the base of said at least one stack on the first upper transport surface.

Preferably, the extraction station comprises a movement device operatively arranged above the first upper transport surface and configured for lifting or lowering the remaining noise reducer elements of each stack. According to a different aspect thereof, the present invention relates to a process for applying noise reducer elements to tyres for vehicle wheels.

The process comprises:
arranging at least one stack of noise reducer elements;
extracting said noise reducer elements one at a time from said at least one stack.

Preferably, the process provides for feeding, in succession, said noise reducer elements extracted from the stack according to a pre-established path.

Preferably, the process provides for picking up said noise reducer elements from said pre-established path.

Preferably, the process provides for applying said noise reducer elements to a radially inner surface of at least one tyre for vehicle wheels.

Preferably, extracting said noise reducer elements one at a time comprises: retaining a first noise reducer element placed at the base of said at least one stack; raising the remaining noise reducer elements of said at least one stack with respect to said first noise reducer element.

Preferably, extracting further comprises: moving away the first noise reducer element according to the pre-established path.

Preferably, extracting further comprises: lowering the remaining noise reducer elements of said at least one stack.

According to a different aspect, the present invention relates to a plant for building tyres for vehicle wheels, comprising: an apparatus for building green tyres for vehicle wheels comprising building devices for building a green tyre; at least one moulding and vulcanisation unit operatively arranged downstream of the building apparatus; at least one apparatus for applying noise reducer elements to tyres for vehicle wheels according to the present invention.

Preferably, said at least one apparatus for applying noise reducer elements is operatively arranged downstream of said at least one moulding and vulcanisation unit.

According to a different aspect thereof, the present invention relates to a process for manufacturing tyres for vehicle wheels, comprising: building green tyres; moulding and vulcanising the green tyres; applying noise reducer elements to the tyres according to the process of the present invention.

Preferably, it is contemplated to apply the noise reducer elements to tyre after moulding and vulcanising said tyre.

The Applicant believes that the present invention allows feeding in an orderly way the noise reducer elements towards the tyres and applying them with accuracy and repeatability to said tyres.

The Applicant also believes that the present invention allows feeding a large number of noise reducer elements in the unit of time, so as to increase the productivity of the line.

The Applicant further believes that the present invention allows managing the noise reducer elements reliably, thereby minimising the risks of standstill of the plant and without damaging and/or impairing the functionality of said noise reducer elements.

The present invention, in at least one of the above aspects thereof, can exhibit one or more of the following preferred features.

Preferably, the noise reducer element comprises a sound-absorbing material, preferably a polymeric foam, preferably polyurethane foam, preferably open cell.

Preferably, the noise reducer element has a thickness comprised between about 20 mm and about 30 mm. Preferably, the noise reducer element has a rectangular or square shape in plain view. Preferably, the noise reducer element has a length (measured along the circumferential development of the tyre when it is installed therein) comprised between about 200 mm and about 250 mm, more preferably equal to about 220 mm. Preferably, the noise reducer element has a width (measured along a rolling axis of the tyre when it is installed therein) comprised between about 100 mm and about 180 mm, more preferably comprised between about 120 mm and about 160 mm.

Preferably, each stack comprises a number of noise reducer elements comprised between ten and forty, more preferably between twenty and thirty.

Preferably, the first upper transport surface is movable at a speed of between about 30 m/min and about 60 m/min.

Preferably, the first conveyor has a length comprised between about 300 mm and about 600 mm.

Preferably, the retention device comprises two first engagement elements configured for acting on opposite sides of said first noise reducer element.

Preferably, said two first engagement elements are placed at opposite longitudinal sides of the first conveyor for acting against the opposite sides of said first noise reducer element parallel to the predefined direction.

Preferably, said two first engagement elements face each other and are movable between a first mutual approached position, in which they act on said opposite sides of said first noise reducer element, and a second mutual moved-apart position, in which they are spaced from said opposite sides.

Preferably, the movement device comprises two second engagement elements configured for acting on opposite sides of at least one of the remaining noise reducer elements.

Preferably, said two second engagement elements face each other and are movable between a first mutual approached position, in which they act on said opposite sides of said at least one of the remaining noise reducer elements, and a second mutual moved-apart position, in which they are spaced from said opposite sides.

Preferably, said second engagement elements are also movable between a lowered position, close to the upper transport surface, and a raised position.

The extraction station therefore allows retaining the noise reducer element resting thereon on the first conveyor and raising the other overlying noise reducer elements of the same stack without the risk of dragging upwards also the noise reducer element at the base.

Preferably, each of the two first engagement elements comprises a plurality of first elongated elements configured for at least partially penetrating into the noise reducer elements.

Preferably, each of the two second engagement elements comprises a plurality of second elongated elements configured for at least partially penetrating into the noise reducer elements.

The first and second elongated elements are, for example, a sort of needles of such dimensions as to be able to penetrate into the sound-absorbing material and then exit therefrom without causing such damage as to impair the functionality thereof, once the noise reducer elements are mounted into the tyre.

Preferably, first elongated elements of each of the two first engagement elements are alternated along the predefined direction with the second elongated elements of a respective second engagement element placed on a same side. In this way, the first and second elongated elements may also engage simultaneously in the same noise reducer element.

Preferably, each of the two first engagement elements comprises:

a first support plate;

a plurality of first elongated elements projecting from the first support plate and side-by-side each other along a first row.

Preferably, each of the two second engagement elements comprises:

a second support plate;

a plurality of second elongated elements projecting from the second support plate and side-by-side each other along a second row.

Preferably, the first elongated elements are alternated with the second elongated elements.

Preferably, said second support plate has through notches configured for receiving the first elongated elements.

Preferably, the retention device comprises two first actuators, each connected to a respective first support plate and configured for moving said first support plate between the first mutual approached position and the second mutual moved-apart position.

Preferably, the movement device comprises two second actuators, each connected to a respective second support plate and configured for moving said second support plate between the first mutual approached position and the second mutual moved-apart position.

Preferably, the movement device comprises two third actuators, each connected to a respective second support plate and configured for moving said second support plate between the lowered position and the raised position.

Preferably, the extraction station comprises two lateral partitions positioned on opposite longitudinal sides for engaging against opposite sides of the stack, wherein each of said two lateral partitions has vertical slits; wherein the first elongated elements and the second elongated elements pass into said vertical slits and are free to slide in said vertical slits.

Preferably, the loading station comprises: a second conveyor having a second upper transport surface configured for supporting a plurality of stacks at a time, wherein said second upper transport surface is movable along a predefined direction.

Preferably, the loading station comprises: an auxiliary conveyor having a vertical transport surface extended alongside and along the second upper transport surface and configured for receiving in abutment said plurality of stacks supported by the second upper transport surface.

The loading station is configured for facilitating the work of an operator who manually arranges the stacks onto the second conveyor, taking care to push them and place them sideways against the third conveyor. In addition to loading, the operator, with the aid of the third conveyor, therefore performs a sort of pre-alignment of the stacks.

Preferably, the second conveyor and the auxiliary conveyor are driven by a single motor, preferably brushless, so as to impart the same transport speed to said two conveyors. Preferably, said transport speed is comprised between about 15 m/min and about 40 m/min. Preferably, the second conveyor and the auxiliary conveyor have a length comprised between about 1000 mm and about 2000 mm.

Preferably, the apparatus comprises a lateral alignment station placed between the loading station and the extraction station, wherein said lateral alignment station is configured for adjusting a lateral position of each stack with respect to a reference. In other words, the lateral alignment station is configured for arranging the successive stacks travelling to the extraction station so that they enter properly into said extraction station.

Preferably, the lateral alignment station comprises a third conveyor having a third upper transport surface configured for supporting at least one stack, wherein said third upper transport surface is movable along a predefined direction.

Preferably, the third conveyor has a length comprised between about 300 mm and about 600 mm. Preferably, a transport speed of the third conveyor is comprised between about 15 m/min and about 40 m/min.

Preferably, the lateral alignment station comprises a vertical abutment surface available in a reference position above the third upper transport surface.

Preferably, the lateral alignment station comprises a pusher acting on top of the third upper transport surface and configured for pushing at least one stack at a time against said vertical abutment surface.

Preferably, said reference position and/or the stroke of the pusher may be set according to the geometry and/or size of the noise reducer elements.

Preferably, the vertical abutment surface is movable between the reference position and a stand-by position spaced apart from the third upper transport surface. When said at least one stack moves to enter into the lateral side alignment station or exit from the lateral alignment station, the vertical abutment surface is placed in the stand-by position so as to prevent said at least one stack from scratching against it. In fact, the material of the noise reducer elements is such as to generate a high friction with the surfaces and to move the stack as a whole and/or the component elements thereof out of the correct position.

Preferably, the apparatus comprises a control device placed between the loading station and the extraction station, wherein said control device is configured for verifying a vertical alignment of the noise reducer elements of each stack. The control device checks that the noise reducer elements forming a stack are correctly stacked, or that all the noise reducer elements have the same orientation.

Preferably, the control device is placed downstream of the lateral alignment station. Preferably, the control device is placed between the lateral alignment station and a subsequent station.

Preferably, the control device comprises at least one sensor configured for detecting the footprint of the stack. Preferably, said control device is of the optical type. Preferably, said sensor comprises at least one photo-detector. Preferably, the optical sensor detects the imprint of the stack on the third conveyor to check the footprint of said stack. Preferably, a position of said sensor may be set according to the geometry and/or size of the stacks/noise reducer elements.

Preferably, the apparatus comprises a defective stack removal station placed downstream of the control device. At least one stack at a time passes in such a removal station and preferably stops waiting to enter into the extraction station. If the stack just checked is not stacked properly, it can then be discarded. For example, such a station allows accessibility by an operator who removes the defective stack before it enters into the extraction station, or an automatic discard device may be provided.

Preferably, the defective stack removal station comprises: a fourth conveyor having a fourth upper transport surface configured for supporting at least one stack at a time, wherein said fourth upper transport surface is movable along a predefined direction. Preferably, said fourth upper transport surface is movable intermittently. Preferably, said fourth upper transport surface is movable at a speed of between about 30 m/min and about 60 m/min. Preferably, the fourth conveyor has a length comprised between about 300 mm and about 600 mm.

Preferably, a station is provided for picking up the noise reducer elements from the conveyor and for applying said noise reducer elements to a radially inner surface of at least one tyre for vehicle wheels.

Preferably, the conveyor comprises a fifth conveyor having a fifth upper transport surface configured for supporting the noise reducer elements. Preferably, said fifth conveyor is placed between the extraction station and the pick-up and application station.

Preferably, the process provides for arranging two side-by-side stacks of noise reducer elements and simultaneously extracting one noise reducer element from each of the two stacks. At each extraction, two aligned noise reducer elements are extracted from two adjacent stacks.

The extraction is carried out from below, taking care to lift and remove detach the upper noise reducer elements from the first noise reducer element placed at the base of the stack before dragging said first noise reducer element away along the predefined path.

Preferably, retaining comprises: retaining the first noise reducer element at opposite sides of said first noise reducer element. Preferably, it is contemplated to act against the opposite sides of said first noise reducer element parallel to the predefined direction.

Preferably, lifting comprises: engaging opposite sides of a second noise reducer element placed immediately above the first noise reducer element and lifting said second noise reducer element. Preferably, it is contemplated to act against the opposite sides of said second noise reducer element parallel to the predefined direction. The lifting of the second noise reducer element causes the lifting of the whole stack portion lying over the first noise reducer element.

Preferably, the first noise reducer element is resting on a first conveyor. Preferably, moving away comprises: moving the first conveyor away according to the pre-established path. The first noise reducer element is extracted from underneath the stack after having vertically lifted up the upper elements and removed in a horizontal direction.

Preferably, lowering comprises: lowering the second noise reducer element until it is rested on the first conveyor.

Preferably, it is contemplated to stop the first conveyor before resting the second noise reducer element thereon.

In this way, any friction between noise reducer elements and/or with other surfaces is prevented.

Preferably, retaining the first noise reducer element comprises: at least partially inserting first elongated elements in the opposite sides of said first noise reducer element.

Preferably, engaging opposite sides of the second noise reducer element comprises: at least partially inserting second elongated elements in the opposite sides of said second noise reducer element.

Preferably, prior to moving away the first noise reducer element according to the pre-established path, first elongated elements are extracted from opposite sides of the first noise reducer element.

Preferably, arranging at least one stack of noise reducer elements comprises: picking up a plurality of stacks from a bale in which said stacks are stored.

Preferably, arranging at least one stack of noise reducer elements comprises: loading a plurality of stacks on a second conveyor and feeding them one after the other to an extraction station.

Preferably, loading further comprises: leaning the stacks against a vertical auxiliary conveyor.

Preferably, the process provides for manually picking up the stacks from the package.

Preferably, the process provides for manually loading the stacks on the second conveyor.

Preferably, the process provides for: adjusting a lateral position of each stack with respect to a reference before extracting said noise reducer elements one at a time from the stack.

Preferably, adjusting comprises: pushing each stacks against a vertical abutment surface.

Preferably, the process provides for: verifying a vertical alignment of the noise reducer elements of each stack before extracting said noise reducer elements one at a time from the stack.

Preferably, verifying comprises: detecting the footprint of the stack.

Further features and advantages will become more apparent from the detailed description of a preferred but non-exclusive embodiment of an apparatus and a process for applying noise reducer elements to tyres for vehicle wheel in a plant and a process for manufacturing tyres for vehicle wheels according to the present invention.

DESCRIPTION OF THE DRAWINGS

Such description is given hereinafter with reference to the accompanying drawings, provided only for illustrative and, therefore, non-limiting purposes, in which:

FIG. 2 shows a detailed top view of the apparatus for applying noise reducer elements in FIG. 1;

FIG. 3 shows a lateral elevation view of the apparatus in FIG. 2;

DETAILED DESCRIPTION

Figure 1:
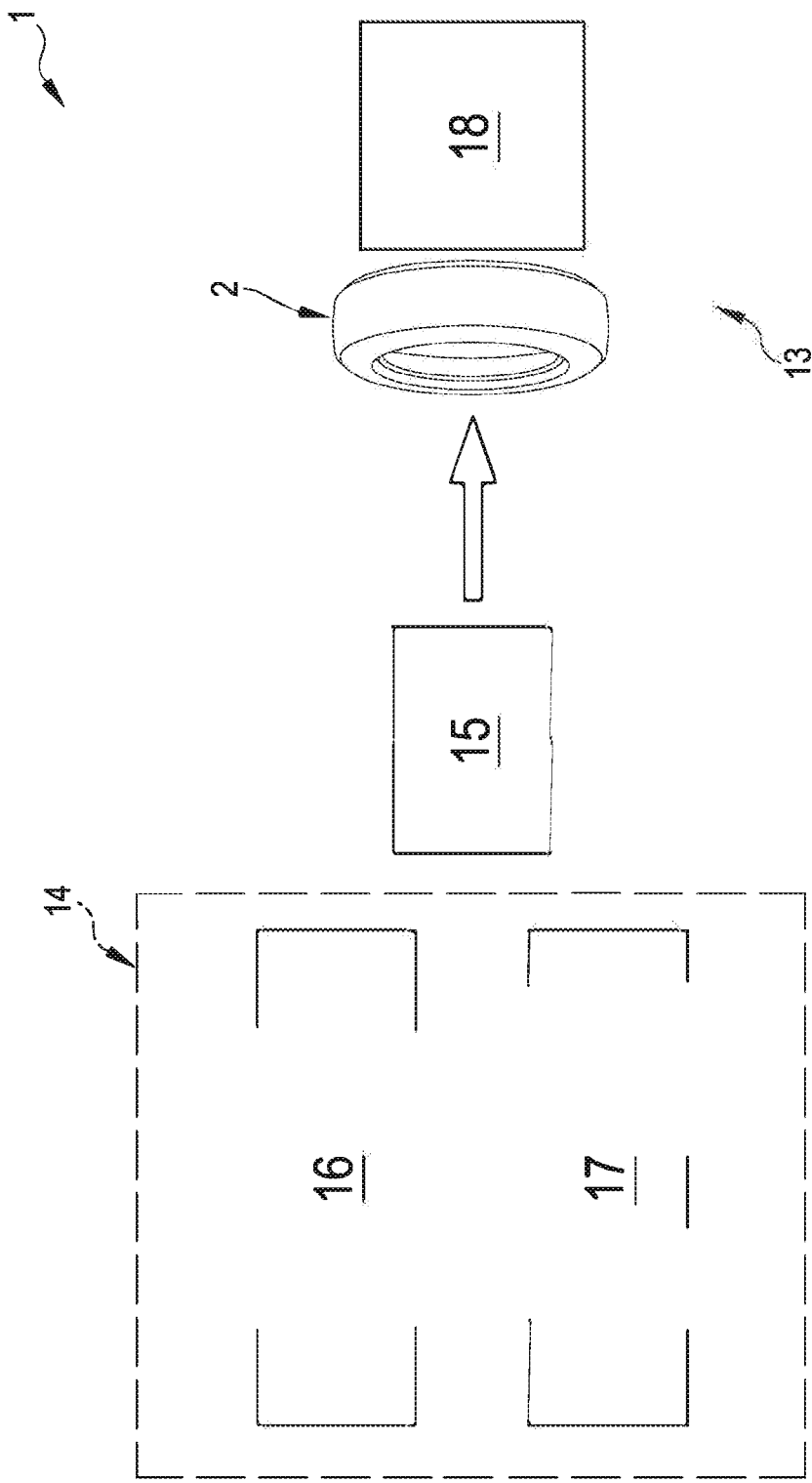
FIG. 1 schematically shows a plant for building tyres for vehicle wheels comprising an apparatus for applying noise reducer elements to tyres for vehicle wheels according to the present invention.

With reference to FIG. 1, reference numeral 1 identifies as a whole a plant for building tyres 2 for vehicle wheels.

Figure 8:
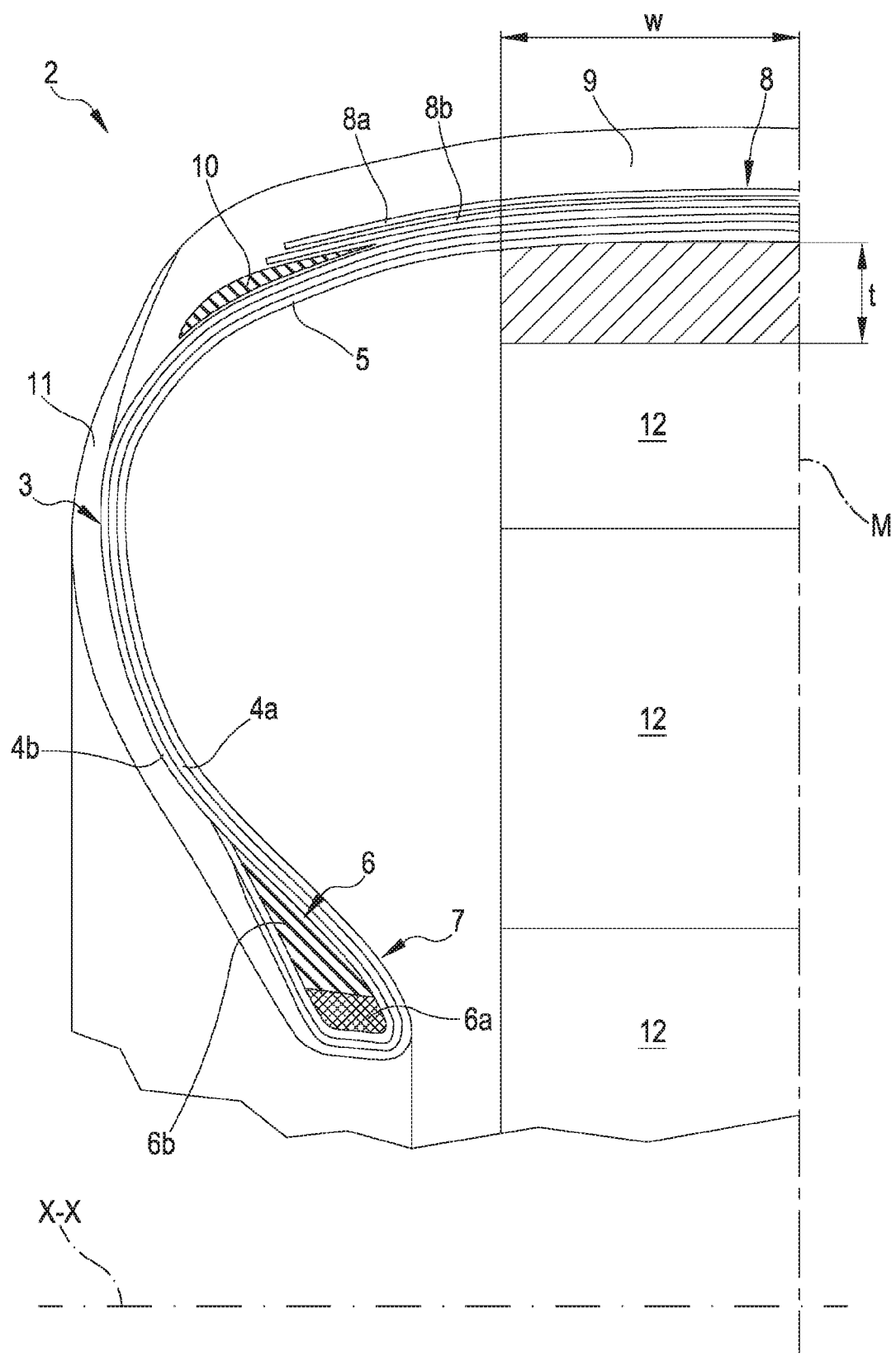
FIG. 8 shows a radial half-section of a tyre built with the plant in FIG. 1.

A tyre 2, built in said plant 1, is shown in FIG. 8 and essentially comprises a carcass structure 3 having two carcass plies 4a, 4b. An airtight layer of elastomeric material or so-called liner 5 is applied internally to the carcass ply/plies 4a, 4b. Two annular anchoring structures 6 comprising each a so-called bead core 6a bearing an elastomeric filler 6b in radially outer position are engaged to respective end flaps of the carcass ply or plies 4a, 4b. The annular anchoring structures 6 are integrated in the proximity of zones usually identified by the name of "beads" 7, at which the engagement between tyre 2 and a respective mounting rim usually occurs. A belt structure 8 comprising belt layers 8a, 8b is circumferentially applied around the carcass ply/plies 4a, 4b, and a tread band 9 is circumferentially overlapped to the belt structure 8. The belt structure 8 can be associated with so-called "under-belt inserts" 10 placed each between the carcass ply/plies 4a, 4b and one of the axially opposite end edges of the belt structure 8. Two sidewalls 11, extending each from the respective bead 7 to a corresponding lateral edge of the tread band 9, are applied in laterally opposite positions on the carcass plies 4a, 4b.

Tyre 2 further comprises noise reducer elements 12 shaped as tiles, coupled to a radially inner surface of tyre 2 located at the tread band 9.

Figure 9:
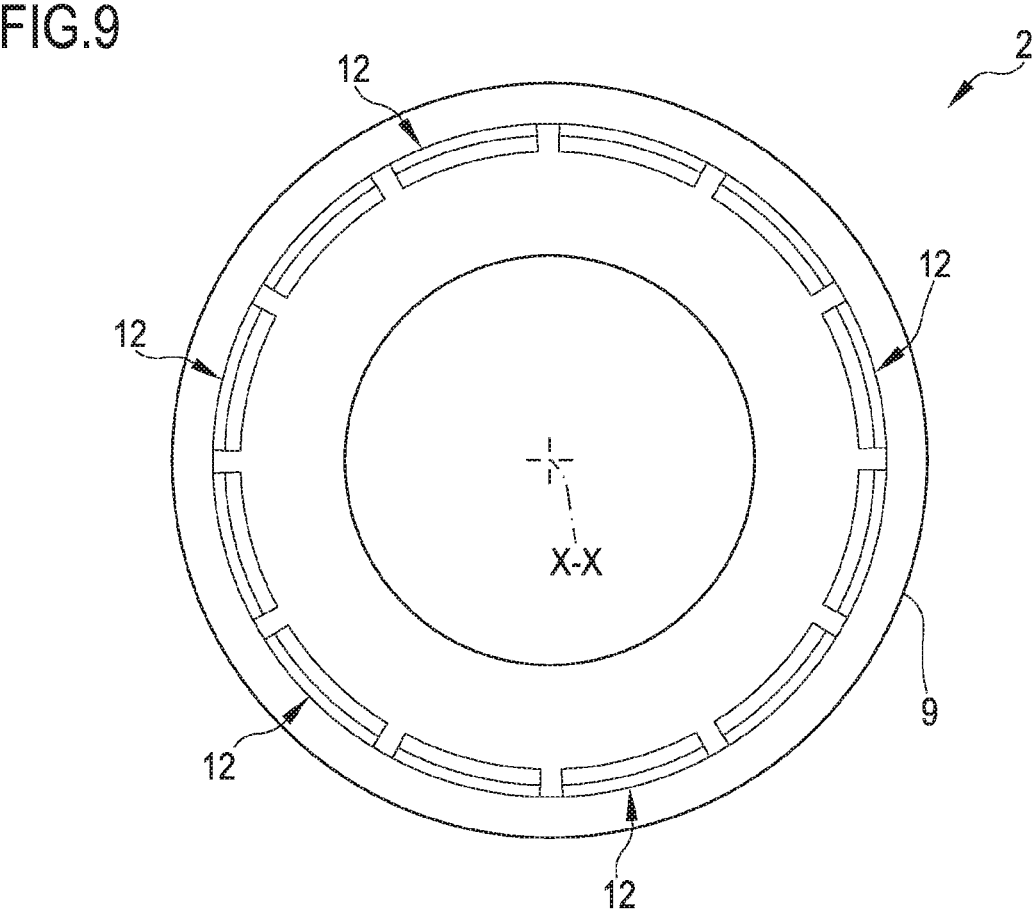
FIG. 9 shows the tyre in FIG. 8 sectioned along a middle plane.
Figure 10:
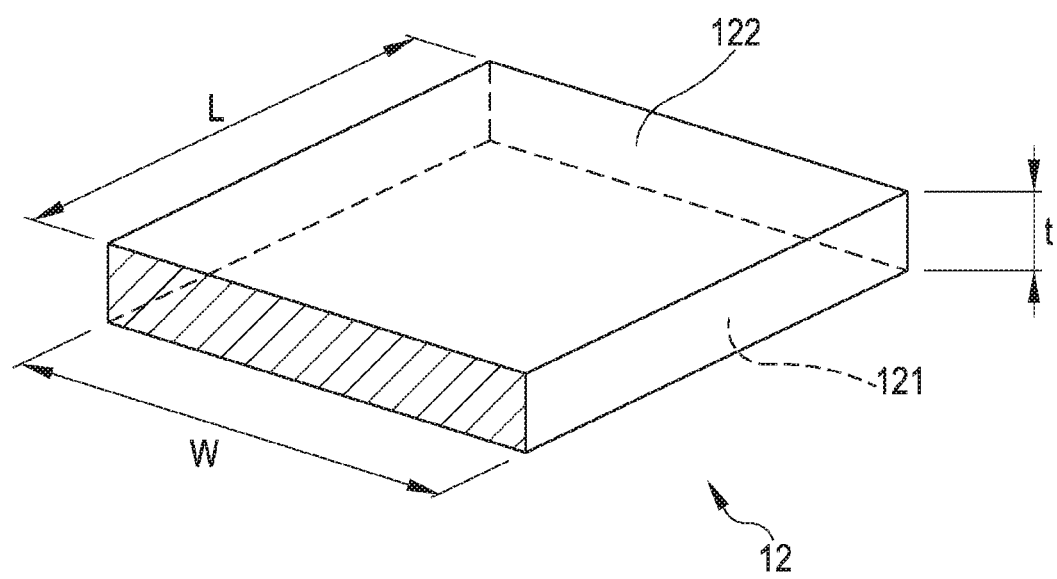
FIG. 10 shows a perspective view of a noise reducer element configured for being installed in the tyre in FIG. 8.

The noise reducer elements 12 are placed astride of a middle plane "M" of tyre 2 and are arranged sequentially side by side, or slightly spaced apart, along the circumferential extension of tyre 2 itself (FIG. 9), in a number depending on the size of tyre 2.

Such noise reducer elements 12 are made of a sound-absorbing material, such as a polymeric foam, preferably of an open cell material, more preferably of polyurethane foam. Their function is to attenuate the noise produced by tyre 2 itself during use.

Each noise reducer element 12 may have a thickness "t" of between about 10 mm and about 40 mm, and a width "W" (measured parallel to an axis of rotation "X-X" of tyre 2) comprised between about 80 mm and about 200 mm.

Plant 1 shown in FIG. 1 comprises a production line 13 of tyres 2 consisting of a building apparatus 14 of green tyres 2 and at least one moulding and vulcanisation unit 15 operatively arranged downstream of the building apparatus 14.

In the non-limiting embodiment of plant 1 shown in FIG. 1, the building apparatus 14 comprises a carcass building line 16 at which forming drums, not shown, are moved between different stations of dispensing semi-finished products designed to form, on each building drum, a carcass sleeve comprising the carcass plies 4a, 4b, liner 5, the annular anchoring structures and possibly at least part of sidewalls 11.

At the same time, in an outer sleeve building line 17, one or more auxiliary drums, not shown, are sequentially moved between different work stations designed to form an outer sleeve on each auxiliary drum, comprising at least the belt structure 8, the tread band 9, and possibly at least part of sidewalls 11.

The building apparatus 14 further comprises an assembling station, not shown, at which the outer sleeve is coupled to the carcass sleeve.

In other embodiments of plant 1, not shown, the building apparatus 14 may be of different type, for example designed to form all of the above components on a single drum by means of building devices.

The built tyres 2 are then transferred to the moulding and vulcanisation unit 15.

As shown in FIG. 1, an apparatus 18 for applying noise reducer elements 12 to tyres 2 is operatively located downstream of the moulding and vulcanisation unit 15.

The moulded and vulcanised tyres 2 are moved, by suitable devices not shown, from the moulding and vulcanisation unit 15 into apparatus 18 for applying noise reducer elements 12.

Apparatus 18 comprises a conveyor belt or a motorised roller 19 for feeding tyres 2 coming from the moulding and vulcanisation unit 15.

In the vicinity of the motorised roller 19, apparatus 1 comprises a loading station 20 of stacks 21 of noise reducer elements 12, an extraction station 22 of said noise reducer elements 12 from each stack 21 placed downstream of the loading station 20, a conveyor 23 placed downstream of the extraction station 22 and extending along a predefined path. The conveyor 23 is configured for supporting and advancing in a succession the noise reducer elements 12 extracted from stacks 21. The loading station 20 acts as a buffer for the noise reducer elements 12.

Each stack 21 may consist of a number of noise reducer elements 12 of between about twenty and about thirty. In the accompanying drawings, for the sake of clarity, each stack 21 comprises six or eight noise reducer elements 12.

A station 24 is arranged at a terminal end of conveyor 23 for picking up the noise reducer elements 12 from conveyor 23 and applying said noise reducer elements 12 to the radially inner surface of tyres 2 carried by the motorised roller 19.

Moreover, apparatus 18 comprises a lateral alignment station 25 placed between the loading station 20 and the extraction station 22, a control device 26 placed downstream of the loading station 20 and before the extraction station 22, a defective stack removal station 27 placed downstream of the control device 26.

The extraction station 22 comprises a first conveyor 29 which has a first upper transport surface 30 configured for supporting at least one stack 21 at a time. The first conveyor 29 has a length comprised between about 300 mm and about 1000 mm. The first upper transport surface 30 is movable at steps along a predefined direction "D" at a speed of between about 20 m/min and about 60 m/min.

In the embodiment shown, the first conveyor 29 is a first conveyor belt wrapped on rollers and the upper transport surface 30 is defined by an upper branch of said first conveyor belt.

A retention device 31 is operatively active above the first upper transport surface 30 and is configured for retaining a first noise reducer element 12' placed at the base of said at least one stack 21 on the first upper transport surface 30. Moreover, a movement device 32 is operatively arranged above the first upper transport surface 30 and is configured for lifting or lowering the remaining noise reducer elements 12 of each stack 21. The retention device 31 allows retaining the first noise reducer element 12' resting thereon on the first conveyor 29 and raising the other overlying noise reducer elements 12 of the same stack 21 without the risk of dragging upwards also the first noise reducer element 12' at the base.

The retention device 31 comprises (FIGS. 4, 5, 6) two first support plates 33, each placed on one of the longitudinal sides of the first conveyor 29. Said two first support plates 33 and the devices moving them are substantially the same, whereby only one will be described hereinafter.

The first support plate 33 carries a plurality of first elongated elements 34 projecting from said first support plate 33 towards the other first support plate 33. The first elongated elements 34 lie in a horizontal plane, are side by side and parallel to each other and are arranged along a first row.

Figure 4:
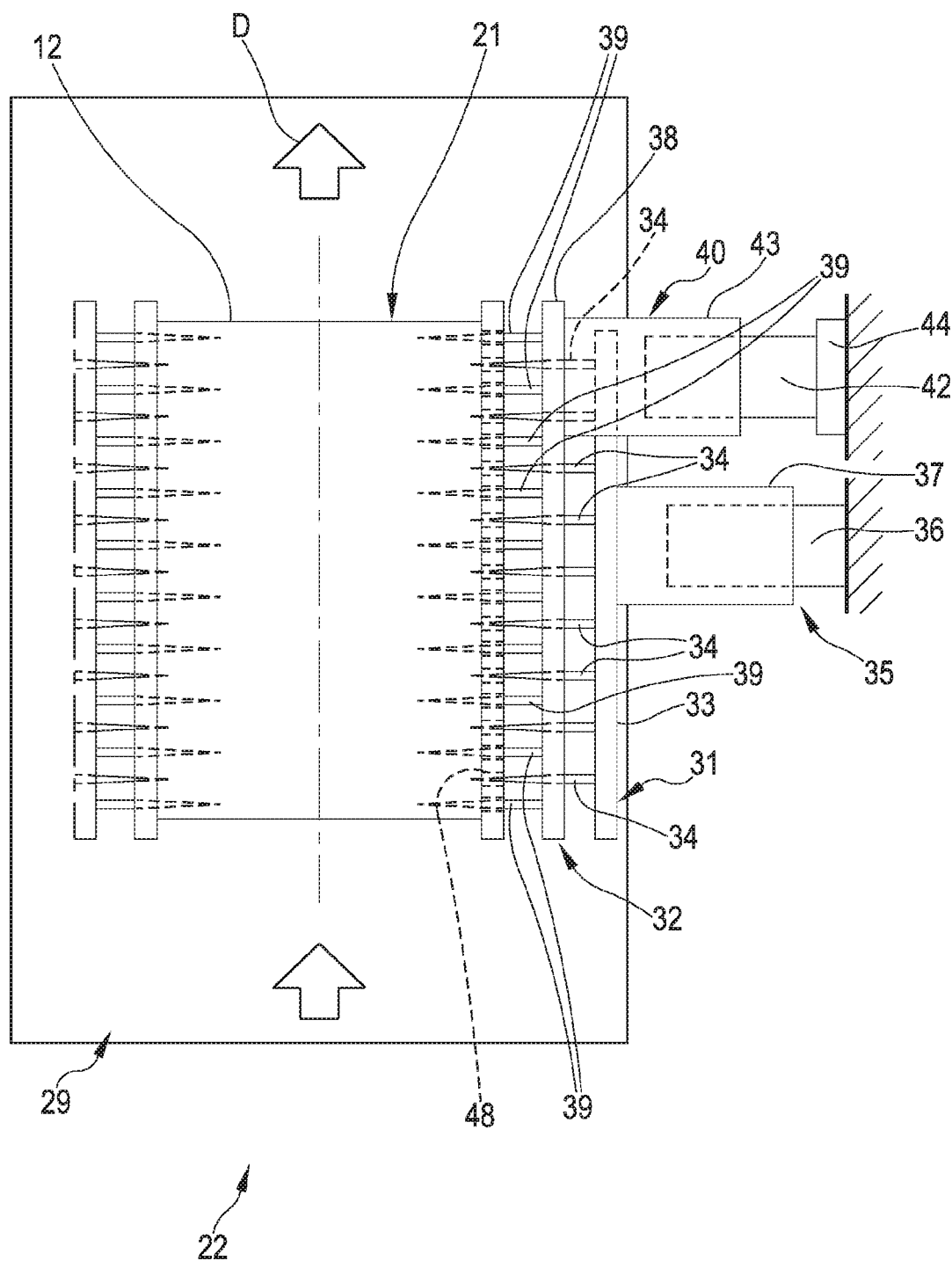
FIG. 4 shows an enlarged top view of a station of the apparatus in FIGS. 2 and 3.
Figure 5:
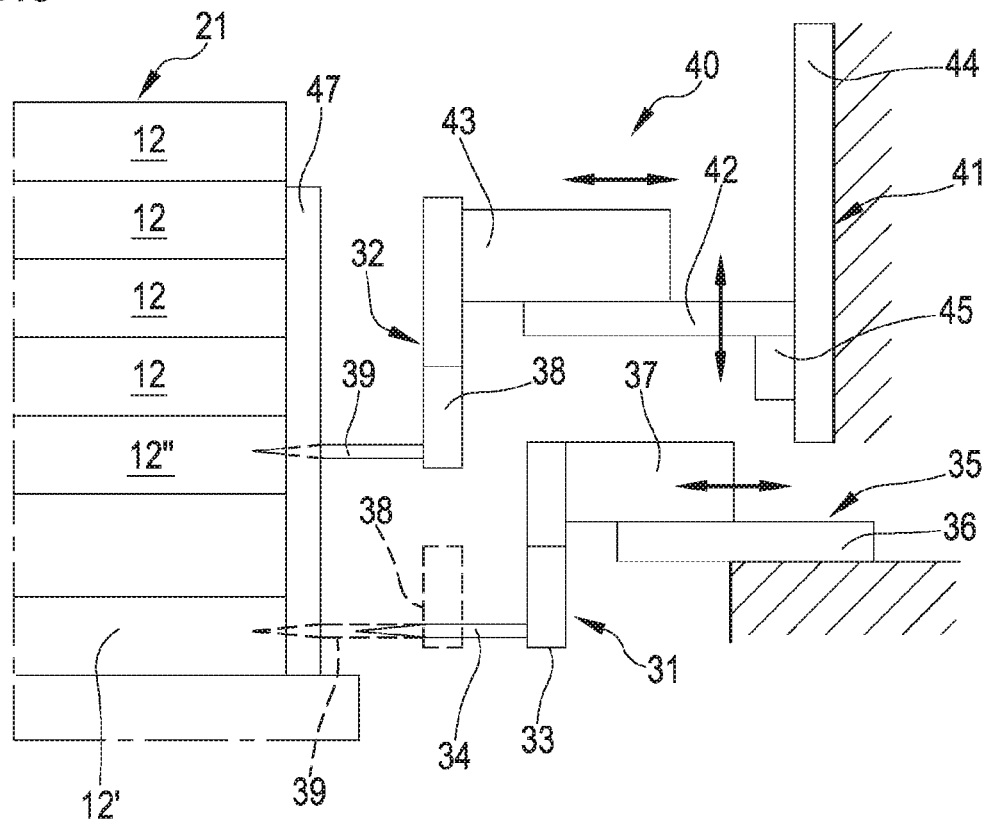
FIG. 5 show a front elevation view of a half of the station in FIG. 4.
Figure 6:
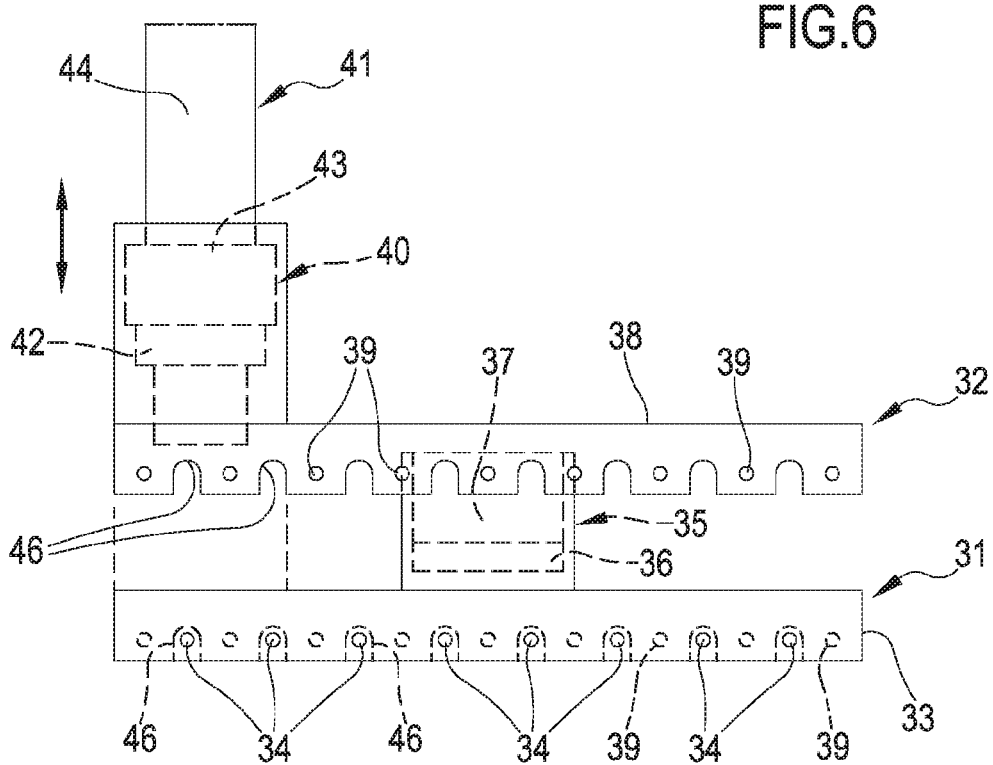
FIG. 6 show a lateral elevation view of some elements of the station in FIG. 4.

As shown in FIGS. 4-6, the first support plate 33 is connected to a first actuator 35. The first actuator 35 is configured for moving the first support plate 33 between a first approached position to the other first support plate 33 and a second moved-away position. The first actuator 35 is therefore is able to move the first support plate 33 and the first elongated elements 34 along a horizontal direction substantially parallel to the first elongated elements 34 and orthogonal to the predefined direction of the first conveyor 29. In the embodiment shown, the first actuator 35 comprises a first guide 36 on which a first slide 37 bearing the first support plate 33 translates. The first actuator 35 may for example be of the electro-mechanical or pneumatic type.

The movement device 32 comprises two second support plates 38, each placed on one of the longitudinal sides of the first conveyor 29. Said two second support plates 38 and the devices moving them are substantially the same, whereby only one will be described hereinafter.

The second support plate 38 carries a plurality of second elongated elements 39 projecting from said second support plate 38 towards the other second support plate 38. The second elongated elements 39 lie in a horizontal plane, are side by side and parallel to each other and are arranged along a second row.

The first and second elongated elements 34, 39 are a sort of needles of such dimensions as to be able to penetrate into the sound-absorbing material and then exit therefrom without causing such damage to said sound-absorbing material as to impair the functionality thereof, once the noise reducer elements 12 are mounted into tyre 2.

As shown in FIGS. 4-6, the second support plate 38 is connected to a second actuator 40 and to a third actuator 41.

The second actuator 40 is able to move the second support plate 38 and the second elongated elements 39 along a horizontal direction substantially parallel to the second elongated elements 39 and orthogonal to the predefined direction of the first conveyor 29. In the embodiment shown, the second actuator 40 comprises a second guide 42 on which a second slide 43 bearing the second support plate 38 translates. The second actuator 40 may for example be of the electro-mechanical or pneumatic type.

The third actuator 41 is configured for moving said second support plate 38 between a lowered position and a raised position. In the embodiment shown, the third actuator 41 comprises a third vertical guide 44 on which a third slide 45 bearing the second guide 42 is slidably mounted. The third actuator 41 is therefore able to move the second support plate 38 and the second elongated elements 39 along a vertical direction between the lowered position, in which the second elongated elements 39 lie at the same level of the first elongated elements 34, and the raised position, in which the seconds elongated elements 39 lie higher than the first elongated elements 34.

The second support plate 38 has, on a lower edge thereof, through notches 46 (FIG. 6) configured for accommodating the first elongated elements 34 of the first support plate 33 when said second support plate 38 is in the lowered position (FIGS. 5 and 6, the second support plate 38 with the through notches 46 and the second elongated elements 39 are shown with dashed lines in the lowered position). The through notches 46 are formed between second adjacent elongated elements 39 and the first elongated elements 34 are vertically aligned with said through notches 46, i.e. staggered with respect to the second elongated elements 39. In other words, the first elongated elements 34 are alternated, along the predefined direction, with the second elongated elements 39. In this way, the first and second elongated elements 34, 39 may also engage simultaneously in the same first noise reducer element 12', as will be described hereinafter.

The first support plates 33 with the respective first elongated elements 34 are two first engagement elements configured for acting on opposite sides of said first noise reducer element 12'.

The second support plates 38 with the respective second elongated elements 39 are two second engagement elements configured for acting on opposite sides of at least one of the remaining noise reducer elements 12.

The extraction station 22 comprises two lateral partitions 47 positioned on opposite longitudinal sides of the first conveyor 29 for engaging against opposite sides of stack 21 positioned in the extraction station 22. Each of said two lateral partitions 47 has vertical slits 48 (shown in FIG. 4), each placed at one of the first or second elongated elements 34, 39. The first elongated elements 34 and the second elongated elements 39 pass in said vertical slits 48 and are free to slide therein during their movements. Said lateral partitions 47 have the function of preventing, during the extraction, the first elongated elements 34 and/or the second elongated elements 39 from remaining engaged in the noise reducer elements 12 themselves.

The loading station 20 comprises: a second conveyor 49 having a second upper transport surface 50 configured for supporting a plurality of stacks 21 at a time. The second upper transport surface 50 is movable along a predefined direction for bringing stacks 21 towards the extraction station 22. In the embodiment shown, the second conveyor 49 is a second conveyor belt wrapped on rollers and the second upper transport surface 50 is defined by an upper branch of said second conveyor belt.

The loading station 20 further comprises an auxiliary vertical conveyor 51 having a vertical transport surface 52 extending alongside and along the second upper transport surface 50. The auxiliary vertical conveyor 51 is also an auxiliary conveyor belt wrapped on rollers and the vertical surface 52 is defined by a branch of said auxiliary conveyor belt. The vertical surface 52 is configured for receiving a side of stacks 21 supported by the second upper transport surface 50 in abutment.

The second conveyor 49 and the auxiliary conveyor 51 are preferably driven by a single motor, not shown and for example brushless, so as to impart the same transport speed to said two conveyors 49, 51.

The second upper transport surface 50 and the vertical transport surface 52 therefore move jointly along the predefined direction and at a transport speed of between about 15 m/min and about 40 m/min. The second conveyor 49 and the auxiliary conveyor 51 have a length comprised between about 500 mm and about 2000 mm.

The lateral alignment station 25 comprises a third conveyor 53 having a third upper transport surface 54 configured for supporting at least one stack 21 at a time, wherein said third upper transport surface 54 is movable along a predefined direction. The lateral alignment station 25 is configured for adjusting a lateral position of each stack 21 with respect to a reference. In the embodiment shown, the third conveyor 53 is a third conveyor belt wrapped on rollers and the third upper transport surface 54 is defined by an upper branch of said third conveyor belt. The third conveyor 53 has a length comprised between about 300 mm and about 600 mm. The third upper transport surface 54 moves in the predefined direction "D" at a transport speed of between about 15 m/min and about 40 m/min.

A vertical abutment surface 55 is operationally active above the third upper transport surface 54 which is connected and moved by an actuator 56, preferably pneumatic, able to move it between a reference position, in which said vertical abutment surface 55 lies on the third upper transport surface 54, and a stand-by position, in which the vertical abutment surface 55 lies spaced apart from the third upper transport surface. The vertical abutment surface 55 and the relevant actuator 56 are placed at a longitudinal side of the third conveyor 53.

A pusher 53 is positioned on the opposite longitudinal side of said third conveyor 53 acting above the third upper transport surface 54. Pusher 57 is connected and driven by a respective actuator 58, preferably pneumatic, and is configured for pushing at least one stack at a time against the vertical abutment surface 54 when the latter is in the reference position.

The control device 26 is arranged between the lateral alignment station 25 and the subsequent defective stack 21 removal station 27 and is configured for checking the vertical alignment of the noise reducer elements of each stack 21. In one embodiment, the control device 26 comprises a photo-detector placed above stacks 21 passing between the lateral alignment station 25 and the subsequent removal station 27. The photo-detector is able to detect whether stacks 21 fall into a maximum predefined width.

The defective stack 21 removal station 27 comprises a fourth conveyor 59 having a fourth upper transport surface 60 configured for supporting at least one stack 21 at a time. The fourth upper transport surface 60 can be moved along a predefined direction "D".

In the embodiment shown, the fourth conveyor 59 is a fourth conveyor belt wrapped on rollers and the fourth upper transport surface 60 is defined by an upper branch of said fourth conveyor belt. The fourth conveyor 59 has a length comprised between about 300 mm and about 600 mm. The fourth upper transport surface 60 moves in the predefined direction "D" at a transport speed of between about 15 m/min and about 40 m/min.

Conveyor 23 placed downstream of the extraction station 21 comprises a fifth conveyor 67 having a fifth upper transport surface 68 configured for supporting the noise reducer elements 12 coming from the extraction station 21. The fifth conveyor 67 has a length comprised between about 300 mm and about 1000 mm. The fifth upper transport surface 68 moves in the predefined direction "D" at a transport speed of between about 15 m/min and about 40 m/min.

A device, not shown, is optionally active on the fifth conveyor 67, which allows packing, or arranging against one another, the noise reducer elements 12 placed in a succession A control unit, not shown in the drawings, is operatively connected to the loading station 20, to the lateral alignment station 25, to the control device 26, to the extraction station 22, to conveyor 23, to the pick-up and application station 24 and to the motorised roller 19 in order to check them according to the process according to the invention.

In use and according to the process according to the invention, tyres 2 extracted from the moulding and vulcanisation unit or units 15 are fed onto the motorised roller 19 and are advanced with an intermittent motion towards the terminal end of said motorised roller 19. One tyre 2 at a time is therefore carried on said terminal end.

Meanwhile, an operator picks up a plurality of stacks 21 of noise reducer elements 12 from a bale, not shown, and manually loads them into the loading station 20, laying them onto the second conveyor 49 and pushing them against the auxiliary vertical conveyor 51. In particular, a first noise reducer element 12 placed at the base of each stack 21 is resting on the second upper transport surface 50 and one side of the same stack 12 is abutted against the second upper transport surface 52. Stacks 21 are therefore aligned in a row on the second conveyor 49. For example, the number of stacks 21 that may simultaneously lie in the loading station 20 is comprised between about ten and about thirty.

The second conveyor 49 is advanced in the predefined direction "D" together with the third conveyor 53 by one step, up to arranging a stack 21 on the third upper transport surface 54. The third upper transport surface 54 is stopped and the lateral position of stack 21 placed in the lateral alignment station 25 is adjusted with respect to a reference. To this end, when stack 21 is already stationary on the third upper transport surface 54, the vertical abutment surface 55 is brought to the reference position (predefined according to the type of noise reducer elements 12 controlled at that time) that is usually already located in the vicinity of one side of stack 12. Thereafter, pusher 57 pushes stack 12 against said vertical abutment surface 55.

Once the lateral alignment has been performed, the third conveyor 53 is advanced in the predefined direction "D" together with the fourth conveyor 59 by one step, up to arrange stack 21 on the fourth upper transport surface 60, or in the defective stack removal station 27. At the same time, a subsequent stack 21 is brought from the loading station 20 up to the lateral alignment station 25 to be subjected to the lateral alignment described above.

During the transit between the third conveyor 53 and the fourth conveyor 59, stack 21 passes underneath the control device 26, which checks the vertical alignment of the noise reducer elements 12 belonging to such a stack 21, i.e. checks that all the noise reducer elements 12 are oriented in the same way and that stack 21 still has the shape of a right parallelepiped.

In one embodiment, the control device 26 allows detecting the footprint of stack 21. For example, the control device 26 comprises a photo-detector which projects a vertical electromagnetic beam placed on a side of stack 21. If stack 21 is properly organised, the vertical electromagnetic beam does not intercept it and is not interrupted. If stack 21 has one or more elements 12 not organised, they intercept the vertical electromagnetic beam and the control device 26 detects the misalignment. The position of the electromagnetic beam may be adjusted according to the geometry of the noise reducer elements 12 controlled by apparatus 18.

In the defective stack removal station 27, stack 21 is stopped again and if it does not meet the vertical alignment requirements detected before, an operator or an automated system can remove it.

Once the vertical alignment has been checked, the fourth conveyor 59 is advanced in the predefined direction "D" together with the first conveyor 29 by one step, up to arrange stack 21 on the first upper transport surface 30, or in the extraction station 22. At the same time, a subsequent stack 21 is carried from the lateral alignment station 25 up to the defective stack removal station 27.

With stack 21 stationary on the first upper transport surface 30, the single noise reducer elements 12 are extracted sequentially starting from the lowest one (FIGS. 7A-7I and 7L).

Figure 7A:
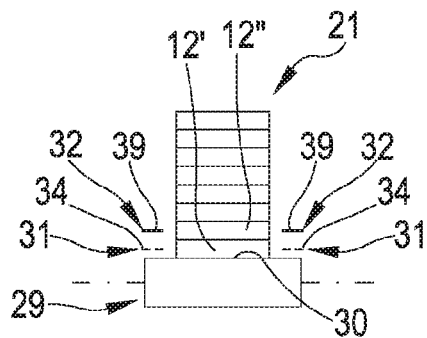
FIGS. 7A-7I and 7L show respective operating configurations in the station shown in FIGS. 4, 5 and 6.

To this end, stack 21 enters and stops in the extraction station 22 while the first elongated elements 34 of the retention device 31 are in the second mutual moved-apart position and also the second elongated elements 39 of the movement device 32 are in the second mutual moved-apart position and in the raised position (FIG. 7A). The first elongated elements 34 are positioned on opposite sides of the first noise reducer element 12 placed at the base of stack 21. The second elongated elements 39 are positioned on opposite sides of a second noise reducer element 12" immediately above or in contact with the first noise reducer element 12'.

Figure 7B:
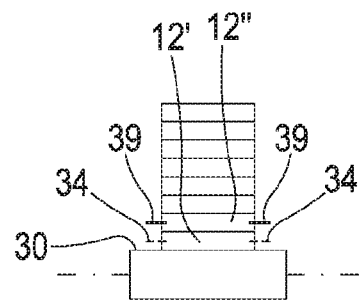

The first elongated elements 34 are brought (by the first actuators 35) to the mutual approached position and partially inserted into the opposite sides of the first noise reducer element 12' and the second elongated elements 39 are brought (by the second actuators 40) to the mutual approached position and partially inserted into the opposite sides of the second noise reducer element 12" (FIG. 7B). In this way, the first noise reducer element 12' is retained on the first upper transport surface 30.

Figure 7C:
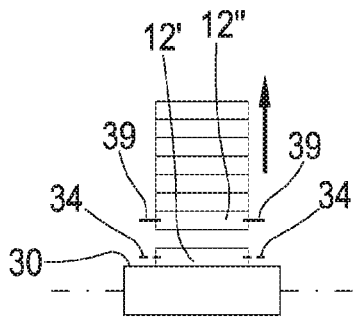

While the first noise reducer element 12' is retained on the first upper transport surface 30, the second elongated elements 39 are moved to the raised position (by the third actuators 41) and they raise the second noise reducer element 12" and all the other noise reducer elements 12 placed above (FIG. 7C).

Figure 7D:
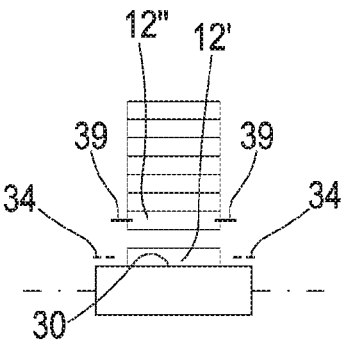

While the second noise reducer element 12" is raised, the first elongated elements 34 are brought (by the first actuators 35) to the mutual moved-apart position and extracted from the opposite sides of the first noise reducer element 12' (FIG. 7D).

Figure 7E:
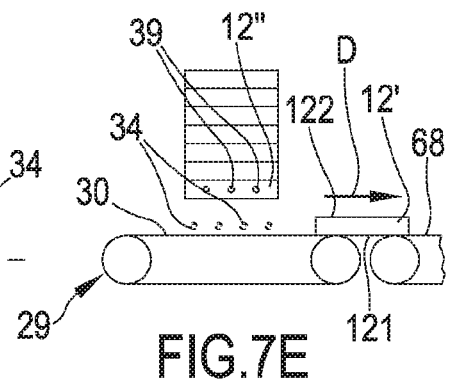
Figure 7F:
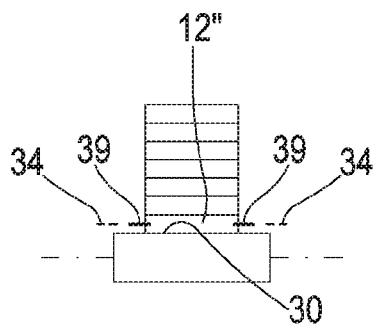
Figure 7G:
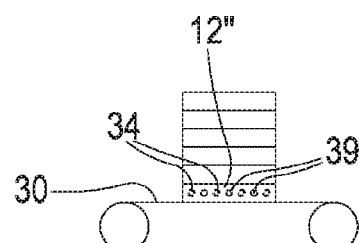

Thereafter, the first conveyor 29 is activated and the first upper transport surface 30 is advanced in the predefined direction "D" and according to the predetermined path together with the fifth upper transport surface 68 of the fifth conveyor 67. In this way, the first noise reducer element 12" is extracted from stack 21, without sliding against the second noise reducer element 12" or against other surfaces of apparatus 18, and is fed according to the predetermined path and towards the pick-up and application station 24 (FIG. 7E).

Once the first noise reducer element 12' has been moved away from the remaining noise reducer elements 12 of stack 21, the first upper transport surface 30 is stopped again. The second elongated elements 39, which are still inserted in the second noise reducer element 12" and support it, are moved (by the third actuators 41) to the lowered position up to rest the second noise reducer element 12" on the first upper transport surface 30 (FIG. 7F) and with the remaining noise reducer elements 12 of stack 21 resting on the second noise reducer element 12".

As described above, on each side, the first and second elongated elements 34, 39 are alternated (FIG. 7G) and the first elongated elements 34 are facing towards the through notches 46 of the first support plate 33 which carries the respective first elongated elements 34.

Figure 7H:
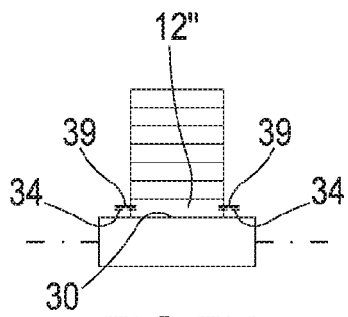
Figure 7I:
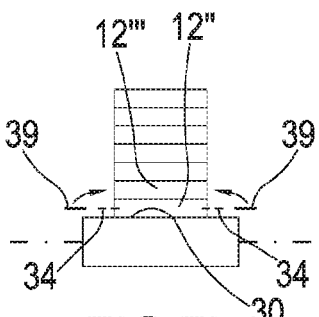

The first elongated elements 34 are returned (by the first actuators 35) to the mutual approached position and inserted into opposite sides of the second noise reducer element 12" (FIG. 7H). In this step, the first and second elongated elements 34, 39 co-exist within the second noise reducer element 12". Notches 46 are placed astride of the first elongated elements 34.

Figure 7L:
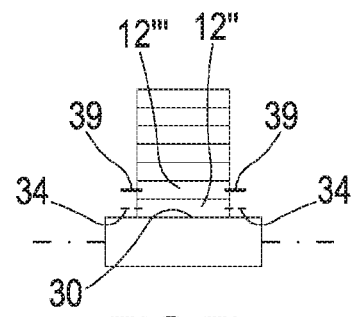

Thereafter, the second elongated elements 39 are extracted from the second noise reducer element 12" (FIG. 7I), then raised to the raised position and partially inserted in the opposite sides of a third noise reducer element 12''' (FIG. 7L). The cycle is then repeated until all the noise reducer elements 12 of stack 21 have finished. Thereafter, a subsequent stack 21 is moved to the extraction station 22.

In an embodiment variant not shown, two or more stacks 21 at a time are inserted in the extraction station 22 (in a row and side by side), suitably sized, which simultaneously extracts two or more noise reducer elements at a time from the two or more stacks 21.

The noise reducer elements 12 arranged in succession one after the other, can move forward, carried by the fifth upper transport surface 68, in groups, for example of three.

EXAMPLE

Assuming that ten stacks 21 can be loaded at a time in the loading station 20, in which each stack 21 comprises thirty noise reducer elements 12 (for a total of three hundred noise reducer elements 12) and considering that the time required to pick up a noise reducer element 12 from conveyor 23 and apply it to a tyre 2 is about four seconds, the autonomy of the loading station 20 is about twenty minutes.

We claim:

1. An apparatus for applying noise reducing elements to tyres for vehicle wheels, comprising:
 a loading conveyor arrangement configured for loading stacks of noise reducing elements;
 an extraction station for extracting noise reducing elements from each stack, wherein said extraction station is placed downstream of the loading station; and
 a supporting and advancing conveyor placed downstream of the extraction station and extended along a set path, wherein said supporting and advancing conveyor is configured for supporting and advancing in succession the noise reducing elements extracted from the stacks for subsequent picking up of the noise reducing elements from the supporting and advancing conveyor and applying of said noise reducing elements to a radially inner surface of at least one tyre for vehicle wheels, wherein said extraction station comprises:
- an extraction conveyor having an extraction conveyor upper transport surface configured for supporting at least one stack at a time, wherein said extraction conveyor upper transport surface is movable along a set direction,
- a retention device comprising first elongated engagement elements operatively active above the extraction conveyor upper transport surface and configured for retaining a first noise reducing element placed at the base of said at least one stack on the extraction conveyor upper transport surface, and
- a movement device comprising second elongated engagement elements operatively arranged above the extraction conveyor upper transport surface and configured for lifting or lowering remaining noise reducing elements of each stack.

2. The apparatus as claimed in claim 1, wherein
the first elongated engagement elements comprise two first elements configured for acting on opposite sides of said first noise reducing element, and
said two first elements face each other and are movable between a first mutual approached position, in which said two first elements act on said opposite sides of said first noise reducing element, and a second mutual moved-apart position, in which said two first elements are spaced from said opposite sides.

3. The apparatus as claimed in claim 2 wherein
the second elongated engagement elements comprise two second elements configured for acting on opposite sides of at least one of the remaining noise reducing elements, and
said second elements face each other and are movable between a first mutual approached position, in which said second elements act on said opposite sides of said at least one of the remaining noise reducing elements, and a second mutual moved-apart position, in which said two second elements are spaced from said opposite sides, said second elements being movable between a lowered position, close to the extraction conveyor upper transport surface, and a raised position.

4. The apparatus as claimed in claim 2, wherein each of the two first elements comprises a plurality of first elongated elements configured for at least partially penetrating into the noise reducing elements.

5. The apparatus as claimed in claim 3, wherein each of the two second elements comprises a plurality of second elongated elements configured for at least partially penetrating into the noise reducing elements.

6. The apparatus as claimed in claim 5, wherein the first elongated elements of each of the two first elements are alternated along the set direction with the second elongated elements of a respective second element placed on a same side.

7. The apparatus as claimed in claim 2, wherein each of the two first elements comprises
a first support plate, and
a plurality of first elongated elements projecting from the first support plate and located side by side along a first row.

8. The apparatus as claimed in claim 3, wherein each of the two second elements comprises
a second support plate, and
a plurality of second elongated elements projecting from the second support plate and located side by side along a second row, and
wherein
the first elongated elements are alternated with the second elongated elements, and
said second support plate has through notches configured for receiving the first elongated elements.

9. The apparatus as claimed in claim 1, wherein
the loading conveyor arrangement comprises a loading conveyor having a loading conveyor upper transport surface configured for supporting one plurality of stacks at a time, and
said loading conveyor upper transport surface is movable along a set direction.

10. The apparatus as claimed in claim 9, wherein the loading conveyor arrangement comprises an auxiliary conveyor having a vertical transport surface extended alongside and along the loading conveyor upper transport surface and configured for receiving in abutment said plurality of stacks supported by the loading conveyor upper transport surface.

11. The apparatus as claimed in claim 10, comprising a lateral alignment station placed between the loading conveyor arrangement and the extraction station, wherein said lateral alignment station is configured for adjusting a lateral position of each stack with respect to a reference.

12. The apparatus as claimed in claim 11, wherein the lateral alignment station comprises
an alignment conveyor having an alignment conveyor upper transport surface configured for supporting at least one stack, wherein said alignment conveyor upper transport surface is movable along a set direction,
a vertical abutment surface available in a reference position above the alignment conveyor upper transport surface, and
a pusher acting on top of the alignment conveyor upper transport surface and configured for pushing at least one stack against said vertical abutment surface.

13. The apparatus as claimed in claim 1, comprising a control device placed between the loading conveyor arrangement and the extraction station, wherein said control device is configured for verifying a vertical alignment of the noise reducing elements of each stack.

\* \* \* \* \*